Oct. 18, 1966     H. C. PEPPEL     3,280,284
DRAWOUT FUSED SWITCH GEAR HAVING A CELL
FOR RECEIVING ARC PRODUCTS
Filed Aug. 23, 1963     2 Sheets-Sheet 1
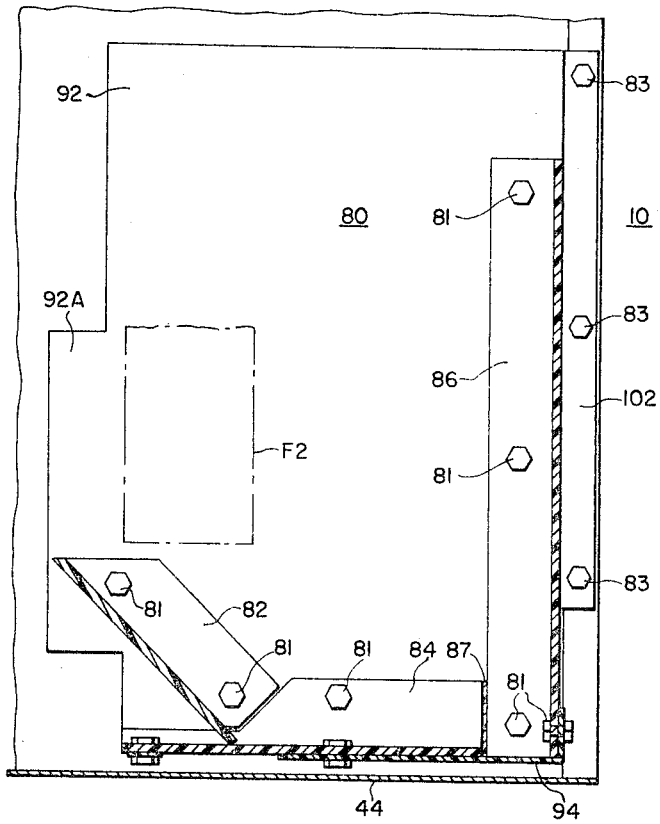
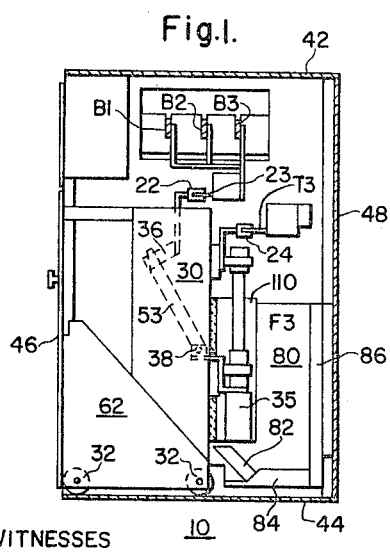
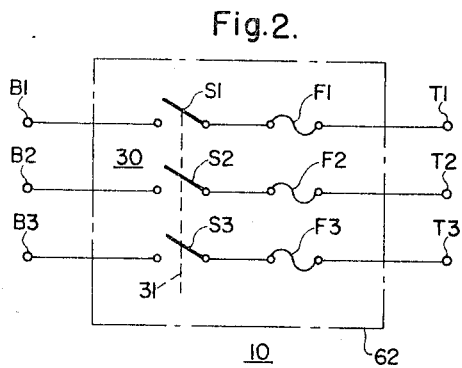
WITNESSES
Theodore F. Wrobel
James F. Young
INVENTOR
Howard C. Peppel
BY
Clement L. McHale
ATTORNEY

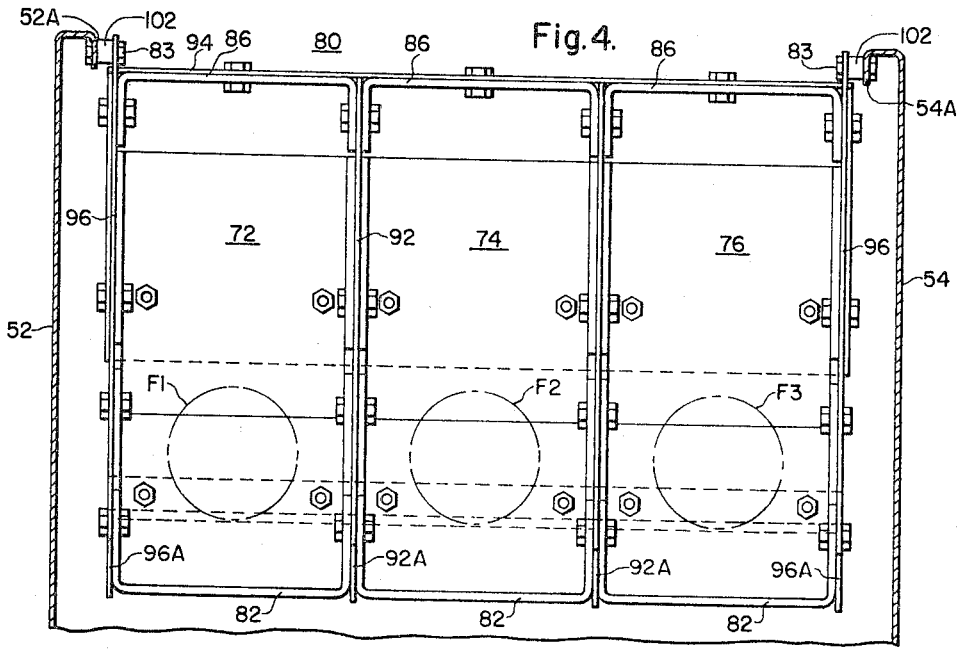
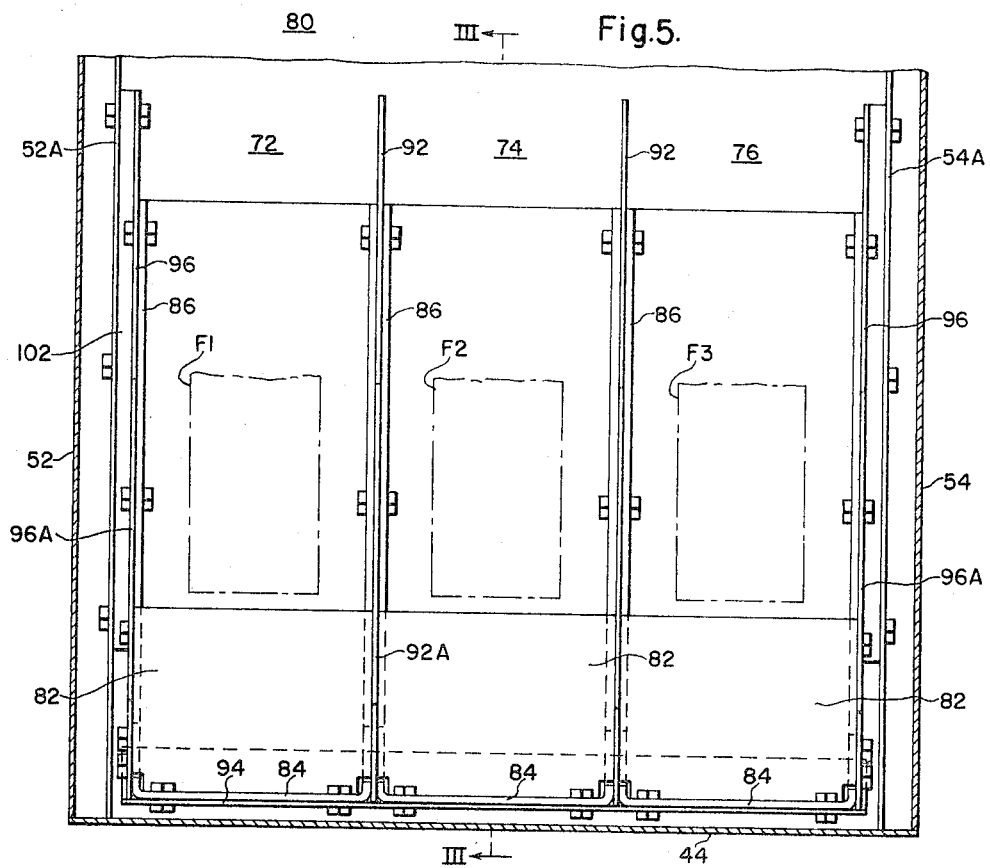

United States Patent Office 3,280,284
Patented Oct. 18, 1966

3,280,284
DRAWOUT FUSED SWITCH GEAR HAVING A CELL FOR RECEIVING ARC PRODUCTS
Howard C. Peppel, Franklin Township, Murrysville, Pa., assignor to Westinghouse Electric Corporation, Pittsburgh, Pa., a corporation of Pennsylvania
Filed Aug. 23, 1963, Ser. No. 304,029
7 Claims. (Cl. 200—120)

This invention relates to enclosed electrical apparatus and more particularly to enclosed circuit interrupters, such as fuses.

In electric power distribution systems, it is sometimes desirable, for reasons of economy, to protect certain types of circuits by employing a load-break disconnecting switch in combination with high power fuses which open when heavy faults occur on the system. In such applications, the use of an automatic circuit breaker as the protective device is precluded because of its higher cost. It is also desirable for reasons of safety and other advantages to provide a metal enclosing housing for such protective devices which may then be mounted on a withdrawable unit to permit inspection of the disconnecting switch and replacement of the power fuses. As the required interrupting ratings of power fuses employed in protective equipment of the type described increase, certain problems arise in keeping the construction of the enclosing housings as compact as possible while at the same time preventing any dangerous flashovers which might otherwise occur during the operation of the power fuses due to the discharge of gaseous and other types of arc products from the power fuses. Such flashovers may occur between the different power fuses disposed in a single hosing or cell or between the power fuses and the grounded portions of the associated housing. It is therefore desirable to provide an improved metal enclosed electrical protective apparatus of the type described which permits a more compact construction, avoids the flashover problems during the operation of the power fuses just mentioned and provides certain other advantages.

It is an object of this invention to provide a new and improved electrical protective apparatus of the enclosed type.

Another object of this invention is to provide an improved means for preventing flashovers due to the operation of one or more circuit interrupters disposed in an enclosing housing.

A further object of this invention is to provide an improved cell structure for housing a drawout unit carrying one or more fuse units.

A still further object of this invention is to provide a more compact cell structure for housing circuit interruptors, such as power fuses.

Other objects of the invention will in part, be obvious and will, in part, appear hereinafter.

For a fuller understanding of the nature and objects of the invention, reference should be had to the following detailed description, taken in connection with the accompanying drawings, in which:

FIGURE 1 is a side elevational view, partly in section, of a drawout unit and its associated housing or cell embodying the principal features of the invention;

FIG. 2 is a diagrammatic view illustrating the electrical connections between the disconnecting switch and the power fuses disposed in the housing shown in FIG. 1;

FIG. 3 is an enlarged view, partly in side elevation and partly in section of a portion of the housing shown in FIG. 1, taken along the line III—III in FIG. 5;

FIG. 4 is a top plan view, partly in section, of the portion of the housing shown in FIG. 3; and FIG. 5 is a front elevational view, partly in section of the portion of the housing shown in FIG. 3.

Referring now to the drawings and FIGS. 1 and 5 in particular, the structure shown comprises a metal enclosed cell or housing 10 which may be constructed by securing sheet metal members which include the top and bottom members 42 and 44, respectively, the rear wall member 48 and the side wall members 52 and 54 to angle frame members (not shown) in a manner well known in the art. A drawout unit 62 is disposed in the cell 10 and may be moved horizontally into and out of the cell 10 on the wheels 82 which run on rails (not shown) disposed at the bottom of the cell. The drawout unit 62 as illustrated includes a front panel 46 formed from sheet metal which completes the front portion of the enclosing cell or housing 10.

As illustrated, the drawout unit 62 is provided with first and second three-phase sets of primary disconnecting contact members 22 and 24, respectively. The primary disconnecting contacts 22 are disposed to engage the associated stationary contact members 23, each of which is electrically connected to one of the bus bar conductors B1, B2 or B3. Similarly, the primary disconnecting contacts 24 are disposed to engage the associated stationary contact members T1, T2 and T3. The primary disconnecting contacts 22 and 24 may be of the finger type which engage and disengage the associated stationary contacts as the drawout unit 62 is moved into or out of the cell 10, respectively.

The drawout unit 62 as illustrated is provided with three power fuses F1, F2 and F3, a three-pole disconnecting switch 30, a levering and interlocking mechanism (not shown) for mechanically moving the drawout unit 62 between the operating or connected position and the test or disconnected position within the cell or housing 10, and an operating mechanism (not shown) for opening and closing the disconnecting switch 30. The levering in and interlocking mechanism provided for the drawout unit 62 may be of the type described in detail in U.S. Patent No. 3,054,874 issued September 18, 1962, to R. C. Dickinson et al. and assigned to the same assignee as the present application. The operating mechanism provided for the disconnecting switch 30 may be of the type described in detail in the above-mentioned U.S. Patent No. 3,054,874.

The disconnecting switch 30 is preferably of the load-break type. The three poles of the disconnecting switch 30 comprise the blade members S1, S2 and S3 which are each hinged on a lower contact member 38 which is secured to and electrically connected to the lower end of one of the associated power fuses F1, F2 and F3 respectively. The upper ends of the contact blades S1, S2 and S3 engage the fixed contact members 36 which are supported by suitable insulating means on the drawout unit 62 and electrically connected to one of the primary disconnecting contacts 22. Each pole of the disconnecting switch 30 may also be provided with an auxiliary switch blade (not shown) which would be disposed in an associated arc chute (not shown) and pivotally attached to one of the main contact blades S1, S2 and S3 as described in detail in U.S. Patent No. 3,054,874, issued September 18, 1962 to R. C. Dickinson et al. and assigned to the same assignee as the present application. Where provided, the auxiliary switch blades function to interrupt arcs drawn during opening of the main switch contact blades S1, S2 and S3 in a manner well known in the art. The switch blades S1, S2 and S3 may be connected to the associated operating mechanism (not shown) by an insulating rod as indicated diagrammatically at 31 in FIG. 2. An also indicated diagrammatically in FIG. 2, each of the power fuses F1, F2 and F3 is connected in series circuit relation with one of the main switch blades S1, S2 and S3, respectively, of the disconnecting switch 30.

As best shown in FIGS. 1 and 5, the three power fuses F1, F2 and F3 are mounted vertically on the drawout unit 62 in side-by-side or parallel spaced relationship at the rear of the cell or housing 10. Each of the power fuses F1, F2 and F3 may be provided with a discharge filter or muffler 35 which is mounted or disposed at the lower end of each of said power fuses, as shown in FIG. 1, to initially cool and deionize the gaseous and other arc products which are expelled or discharged from the lower end of each of said power fuses whenever one or more of said power fuses operates in response to an abnormal operating condition in the associated circuits to which said power fuses are connected. The upper end of each of the power fuses F1, F2 and F3 is supported by a suitable insulator on the drawout unit 62 and is electrically connected to one of the associated stationary contact members T1, T2 and T3, respectively, through one of the primary disconnecting contacts 24. The lower end of each of the power fuses F1, F2 and F3 is also supported by a suitable insulator on the drawout unit 62 and is electrically connected in series circuit relation with one of the main contact blades S1, S2 and S3, respectively, of the disconnecting switch 30 through the hinged contact member 38 at the lower end of the associated main switch contact blade.

It has been found that when the power fuses F1, F2 and F3 are designed for a relatively high interrupting rating or capacity and when one or more of said fuses operate or interrupt on systems having the maximum fault capacity for which said fuses are designed, a large volume of high temperature and high velocity gaseous and other arc products are discharged or emitted from the lower end of said power fuses or from the lower end of the associated discharge filters 35. The latter arc products include ionized gases and are also accompanied by flames. In order to prevent the ionized gases included in the arc products discharged from the power fuses F1, F2 and F3 from forming conductive paths either between the different power fuses F1, F2 and F3 or between said power fuses and the grounded portions of the cell or housing 10, which is normally grounded for reasons of safety, an insulating receptacle or container 80 is disposed around the lower ends of the power fuses F1, F2 and F3 at the rear of the cell or housing 10, as shown generally in FIG. 1 and in greater detail in FIGS. 3 through 5. Broadly, the insulating receptacle 80 includes a plurality of compartments 72, 74 and 76 which are associated with the power fuses F1, F2 and F3, respectively to receive the arc products which are discharged from the lower end of said power fuses during the operation thereof. It is to be noted that the insulating receptacle 80 is preferably secured or fastened to the stationary walls of the cell or housing 10, as will be described in detail hereinafter, and that the power fuses F1 through F3 are moved into the different isolated compartments of said receptacle when the drawout unit 62 is moved into the cell 10, as best shown in FIG. 1.

More specifically, the insulating receptacle or container 80 is formed from a suitable electrically insulating material having sufficient structural strength to withstand the impact or shock of the arc products discharged from the power fuses F1 through F3 and also having flame retardant characteristics, such as glass polyester. In particular, the receptacle 80 include a plurality of substantially vertical side wall portions 92 and 96 which are disposed in side-by-side or parallel spaced relationship from a suitable insulating sheet or plate material of the type described to form the compartments 72, 74 and 76. The first and second outer side wall portions 96 are disposed between the fuse F1 and the side wall 52 of the cell 10 and between the fuse F3 and the side wall 54 of the cell 10, respectively. The first and second intermediate side wall portions 92 of the receptacle are disposed between the fuses F1 and F2 and between the fuses F2 and F3, respectively. In order to close off the compartments 72, 74 and 76 of the receptacle 80 at the rear of the cell 10, the substantially vertical end wall portions 86 are provided to connect the respective side wall portions 92 and 96 and may be formed in the shape of channel members from a suitable insulating material of the type described. The vertical end wall portions 86 may be secured or fastened to the associated side wall portions 92 and 96 by suitable means, such as the bolts 81 which are also formed of a suitable insulating material, such as fiber. Similarly, the lower ends of the compartments 72, 74 and 76 of the receptacle 80 adjacent to the bottom of the cell 10 are substantially closed off by the bottom portions 84 which connect the respective side wall portions 92 and 96 at the bottom thereof and which may be also formed from a suitable insulating material of the type described in the form of channel members which are secured or fastened to the associated side wall portions by the insulating bolts 81. Any space between the respective bottom portions 84 and the end wall portions 86 may be substantially filled or closed by an insulating member 87 formed from insulating material of the type described. At the front of each of the compartments 72, 74 and 76 of the receptacle 80, there is disposed a front end wall portion 82 which is secured to and connects the adjacent side wall portions 92 and 96 in each of said compartments. Each of the front end wall portions 82 is formed from a suitable insulating material of the type described in the form of a channel member and is disposed at an oblique angle with respect to the associated horizontal bottom portion 84 in each of the compartments 72, 74 and 76 and also at an oblique angle with respect to the longitudinal dimension of the associated power fuses F1, F2 and F3. Each of the front end wall portions 82 extends from the associated bottom portion 84 as best shown in FIG. 3 diagonally upwardly to a level which is just below the ends of the associated power fuse to deflect the gaseous and other arc products from the lower end of one of the power fuses F1, F2 or F3 or its associated discharge filter into one of the associated compartments 72, 74 or 76, respectively, of the receptacle 80 and rearwardly towards the rear of the cell 10 away from the disconnecting switch 30 and its associated operating and levering mechanisms. It is to be noted that each of the side wall portions 92 and 96 of the receptacle 80 includes a forwardly extending projecting portion 92A and 96A, respectively, to eliminate any possibility that the arc products from the power fuses F1, F2 and F3 might cause a flashover around the front ends of the side wall portions 92 and 96 adjacent to the upper end of the front end wall portions 82. Any slight openings or cracks between the adjacent compartments of the receptacle 80, particularly in the lower portion thereof, may be filled with any insulating cement, such as an epoxy resin, to substantially seal off the different compartments from one another or from the cell 10.

In order to reinforce or brace the joint between the rear end wall portions 86 and the bottom portions 84 at the lower rear corner of the receptacle 80, the angle member 94 may be secured or fastened to the respective end wall portions and the bottom portions 84 by suitable insulating bolts 81 as best shown in FIGS. 3 and 4. The angle member 94 may be formed from a suitable insulating sheet material of the same type as previously described for the other portions of the receptacle 80.

In order to provide supports for the receptacle 80 within the cell 10, the rear portions of the side walls 52 and 54 of the cell 10 may be turned inwardly as best shown in FIG. 4 to form supporting flanges, as indicated at 52A and 54A, respectively. The rearwardly extending portions of the outer side wall portions 96 may be then secured or bolted to the flange portions 52A and 54A of the side walls 52 or 54, respectively, with a spacer member 102 disposed between the receptacle 80 and each of the flange portions of said side walls, as indicated in FIGS. 4 and 5.

In order to prevent any ionized gases from entering the switch operating mechanism or other portions of the drawout unit upon operation of one or more of the fuses F1, F2 or F3, the drawout unit 62 is provided at the rear thereof with three insulating channel members 110 which in general are disposed between each of the fuses F1, F2 and F3 and the rest of the drawout unit. Each of the latter channel members are preferably formed from the same insulating material as the different portions of the receptacle 80 with the base of each channel member being mounted vertically on the back of the drawout unit between one of the fuses F1, F2 and F3 and the front portion of said drawout unit and with the sides of each channel member extending rearwardly around the sides of the associated fuse. The latter channel members cooperate with the receptacle 80 to substantially close off the upper portion at the front of each of the compartments 72, 74 and 76, and complete the front wall portion of said receptacle above the front end wall portions 82. The width of each of the latter channel members is arranged to be slightly less than the width of each of the associated compartments 72, 74, and 76 of the receptacle 80 to permit movement of the fuses F1, F2, and F3 into said receptacle.

In considering the operation of the power fuses F1 through F3, it is important to note that the insulating material from which the different portions of the receptacle 80 are formed is substantially impervious to the flow of the gaseous arc products which result from the operation of said fuses and that the bottom portion of each of the compartments 72, 74 and 76 is substantially sealed to prevent the gaseous arc products from reaching the bottom portion 44 or the rear wall portion 48 of the cell 10 whenever one or more of said fuses operates to interrupt the fault current in the associated circuits to which the fuses are connected. It has been found that when one or more of the power fuses F1, F2 and F3 discharges or expels gaseous and other arc products from the lower end thereof or from the lower end of the associated discharge filter, the gaseous arc products travel downwardly until the gaseous arc products are deflected toward the rear of the receptacle 80 and a swirling motion is imparted to said gaseous arc products which effectively mixes said arc products with the cooler air within each of the compartments 72, 74 and 76 and efficiently cools and deionizes any ionized gases included in said arc products within each of said compartments. It is to be noted that the vertical height of the side wall portions 92 and 96 and the rear end wall portions 86 should be sufficient to cool any ionized gases which result from the operation of the power fuses F1, F2 and F3 below the ionization level before said gases leave the receptacle 80. In other words, by providing the front end wall portions 82 at an oblique angle with respect to the longitudinal axis of the associated power fuses F1 through F3, the energy or shock resulting from the discharge of the gaseous and other arc products from said power fuses during the operation thereof is effectively dissipated in the individual compartments 72, 74 and 76 of the receptacle 80 which are structurally and electrically isolated from one another.

It has also been found that the receptacle 80 as disclosed permits a considerable reduction in the electrical clearances required between the adjacent power fuses F1, F2, and F3 and between said power fuses and the grounded portions of the associated cell or housing 10 at relatively high interrupting ratings of the power fuses. In addition, the receptacle 80 as disclosed prevents the physical or mechanical distortion to the adjacent wall portions of the cell or housing 10 which would otherwise result from the shock and flames due to the gaseous arc products which are discharged from one or more of the power fuses during operation due to heavy fault conditions.

It is to be noted that the construction disclosed by the applicant permits the connection of a source of electrical power to either the bus bars B1, B2 and B3 or to the stationary terminals T1, T2 and T3 in a particular application rather than requiring that the lower end of the power fuses F1 through F3 be connected to the load circuit. The latter arrangement has been used in the past so that following interruption of a fault current, the lower end of the fuse and the gaseous arc products discharged therefrom will not be adjacent to the line potential. It is also to be noted that since the receptacle 80 as disclosed is open to the atmosphere or to the interior of the cell 10 at least at the upper portion of said receptacle, the power fuses F1 through F3 which are employed in a particular application can be applied at the full interrupting capacity or rating of said fuses since there is no back pressure resulting from the use of said receptacle as in the case of a completely closed container.

It is to be understood that the teachings of the invention may be applied to single phase circuits as well as polyphase circuits and to other types of metal enclosed electrical apparatus in which circuit interrupters other than fuses are disposed to receive and cool or deionize the arc products which may be discharged from such circuit interrupters, such as automatic circuit breakers.

The apparatus embodying the teachings of this invention has several advantages. For example, the dangerous flashovers which might otherwise result from the operation of power fuses having relatively high interrupting capacity or ratings which are disposed in a metal enclosed housing of the type described is prevented. In addition, the cell or housing can be constructed to be much more compact with a smaller width and with a lower height than would otherwise be required in a particular application to provide the necessary electrical clearances. Further, the construction as disclosed permits the connection of a source of electrical power to either set of stationary contacts or terminals provided in a cell or housing in a particular application rather than requiring the connection of the source to a particular set of contacts or terminals. Finally, the mechanical or physical distortion of the housing or cell which might otherwise result from the operation of power fuses having relatively high interrupting capacities is avoided by the use of a construction as disclosed by the applicant.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. An enclosed electrical apparatus comprising a cell formed from conducting material, a drawout unit having an elongated fuse member thereon disposed in the cell, said fuse member being disposed with the longitudinal axis thereof substantially vertical, the lower end of the fuse member having an opening through which any arc products resulting from circuit interruption by said fuse member are expelled, and a generally rectangular receptacle formed of electrically insulating material and disposed substantially around and below the lower end of said fuse member and having a closed end spaced from the lower end of the fuse between the cell and the fuse, said receptacle including first and second side wall portions, end wall portions connecting said side wall portions and a bottom wall portion, at least one of said end wall portions being disposed in the path of the arc products expelled from the lower end of the fuse member and at an oblique angle with respect to the longitudinal axis of and below the lower end of said fuse member between the lower end of the fuse member and the cell to deflect the arc products from said fuse member into said receptacle and to dissipate the energy of said arc products, the last-mentioned end wall portion being substantially impervious to the flow of arc products from the fuse member.

2. An enclosed electrical apparatus comprising a cell formed from conducting material, a drawout unit having at least one fuse unit thereon disposed in the cell, said fuse unit being disposed in a substantially vertical position to expel any arc products resulting from the operation of said fuse unit from the lower end thereof, and a generally rectangular receptacle for receiving said arc products secured to the interior of said cell, said receptacle being formed from electrically insulating material and including at least two substantially vertical parallel side wall portions spaced from one another and connected to one another by a first substantially vertical end wall portion, by a substantially horizontal bottom portion, and by a second end wall portion disposed at an oblique angle with respect to said bottom portion, said last-mentioned end wall portion being disposed below said fuse unit to deflect said arc products into said receptacle to prevent a flashover from said fuse unit to said cell during operation of said fuse unit.

3. An enclosed electrical apparatus comprising a cell formed from conducting material, a drawout unit having at least one fuse unit thereon disposed in the cell, said fuse unit being disposed in a substantially vertical position to expel any arc products, including ionized gases resulting from the operation of said fuse unit from the lower end thereof, and a generally rectangular receptacle for receiving said arc products secured to the interior of said cell, said receptacle being formed from electrically insulating material and including two substantially vertical parallel side wall portions spaced from one another and connected to one another by a first substantially vertical end wall portion, by a substantially horizontal bottom portion, and by a second end wall portion disposed at an oblique angle with respect to said bottom portion, said last-mentioned end wall portion being disposed below said fuse unit to deflect said arc products into said receptacle to prevent a flashover from said fuse unit to said cell during operation of said fuse unit, the height of each of said side wall portions and said first end wall portion being sufficient to cool said ionized gases below the ionization level.

4. An enclosed electrical apparatus comprising an enclosing housing formed of conductive material, a plurality of elongated fuse units disposed substantially vertically within said housing in side-by-side relation, the lower end of each fuse unit having an opening through which arc products therefrom resulting from the operation of said fuse unit are expelled, and a container formed from electrically insulating material having a plurality of compartments each adjacent to one of said fuse units to receive the arc products therefrom, the compartments of said container being each disposed substantially around and below the lower portion of one of said fuse units and having a closed end spaced from the lower end of the associated fuse unit between the housing and the fuse unit, at least one portion of said container being disposed in the path of the arc products expelled from the fuse units and below and at an oblique angle with respect to the longitudinal dimension of each fuse unit between the lower ends of the fuse units and the housing to deflect the arc products thereof into one of the compartments of said container, said one portion being substantially impervious to the flow of arc products from the fuse units, said container including vertical portions interposed between adjacent fuse units and between said fuse units and said housing at least adjacent to the lower portions of said fuse units.

5. A switchgear structure comprising a cell formed from conducting material, a drawout unit having a multi-pole switch thereon disposed in the cell, a fuse connected in series circuit relation with each pole of the switch, said fuses being disposed on the drawout unit in side-by-side relation behind the associated poles of the switch and in substantially vertical positions to expel the arc products resulting from the operation of said fuses from the lower ends thereof, and a receptacle formed from electrically insulating material having a plurality of compartments each associated with one of said fuses to receive the arc products therefrom, said receptacle being generally rectangular and including a plurality of substantially vertical parallel side wall portions spaced from one another and disposed between said fuses and said cell, the adjacent side wall portions being connected by a first substantially vertical end wall portion, by a substantially horizontal bottom wall portion and a second end wall portion disposed at an oblique angle with respect to said bottom portion, the last-mentioned end wall portions being each disposed below the lower end of one of said fuses to deflect the arc products therefrom into one of said compartments to prevent flashovers between fuses and between each fuse and said cell upon the operation of said fuses.

6. A switchgear structure comprising a cell formed from conducting material, a drawout unit having a multi-pole switch thereon disposed in the cell, a fuse connected in series circuit relation with each pole of the switch, said fuses being disposed on the drawout unit in side-by-side relation behind the associated poles of the switch and in substantially vertical positions to expel the arc products including ionized gases resulting from the operation of said fuses from the lower ends thereof, and a receptacle formed from electrically insulating material having a plurality of compartments each associated with one of said fuses to receive the arc products therefrom, said receptacle being generally rectangular and including a plurality of substantially vertical parallel side wall portions spaced from one another and disposed between said fuses and between said fuses and said cell, the adjacent side wall portions being connected by a first substantially vertical end wall portion, by a substantially horizontal bottom wall portion and a second end wall portion disposed at an oblique angle with respect to said bottom portion, the last-mentioned end wall portions being each disposed below the lower end of one of said fuses to deflect the arc products therefrom into one of said compartments to prevent flashovers between fuses and between each fuse and said cell upon the operation of said fuses, the height of each of said side wall portions and said first end wall portions being sufficient to cool said ionized gases below the ionization level.

7. An enclosed electrical apparatus comprising a cell formed from conducting material, a drawout unit having at least one fuse unit thereon disposed in the cell, said fuse unit being disposed in a substantially vertical position to expel any arc products resulting from the operation of said fuse unit from the lower end thereof, and a generally rectangular receptacle for receiving said arc products secured to the interior of said cell, said receptacle being formed from electrically insulating material and including at least two substantially vertical parallel side wall portions spaced from one another and connected to one another by a first substantially vertical end wall portion, by a substantially horizontal bottom portion, and by a second end wall portion disposed at an oblique angle with respect to said bottom portion, said last-mentioned end wall portion being disposed below said fuse unit to deflect said arc products into said receptacle to prevent a flashover from said fuse unit to said cell during operation of said fuse unit, said drawout unit including an insulating member which substantially closes off the end of said receptacle above said second end wall portion.

References Cited by the Examiner

UNITED STATES PATENTS

| | | | |
|---|---|---|---|
| 581,460 | 4/1897 | Harrington | 200—120 |
| 1,819,207 | 8/1931 | Slepian. | |
| 1,955,138 | 4/1934 | Mangan | 200—127 |
| 2,993,967 | 7/1961 | Jelley | 200—50 X |

FOREIGN PATENTS 818,629  6/1937  France.

BERNARD A. GILHEANY, *Primary Examiner.*

H. A. LEWITTER, *Assistant Examiner.*